United States Patent [19]

Okamura et al.

[11] Patent Number: 5,021,969

[45] Date of Patent: Jun. 4, 1991

[54] MANIPULATOR OPERATING APPARATUS

[75] Inventors: Ryo Okamura, Kawasaki; Shinichiro Nishida, Funabashi; Makoto Asakura, Tokyo, all of Japan

[73] Assignee: Kabushiki Kaisha Toshiba, Kawasaki, Japan

[21] Appl. No.: 323,754

[22] Filed: Mar. 15, 1989

[30] Foreign Application Priority Data

Mar. 17, 1988 [JP] Japan .................................. 63-64065

[51] Int. Cl.$^5$ ............................................. G05B 17/02
[52] U.S. Cl. ....................................................... 364/513
[58] Field of Search ...................... 338/128; 901/5, 15; 378/58, 204; 364/513

[56] References Cited

U.S. PATENT DOCUMENTS

| | | | |
|---|---|---|---|
| 3,951,271 | 4/1976 | Mette | 901/5 |
| 3,958,740 | 5/1976 | Dixon | 901/5 |
| 4,555,960 | 12/1985 | King | 338/128 |
| 4,823,279 | 4/1989 | Perzley et al. | 901/15 |

FOREIGN PATENT DOCUMENTS 62-173184  1/1986  Japan .

OTHER PUBLICATIONS

Journal of "6–Degrees–of–Freedom Bilateral Control of a Multi-Articulated Manipulator Using a Rectangular Coordinates Type Master Arm", The Robotics Society of Japan, vol. 6, No. 1, pp. 75 to 81.

*Primary Examiner*—Allen R. MacDonald
*Assistant Examiner*—Roger S. Joyner
*Attorney, Agent, or Firm*—Oblon, Spivak, McClelland, Maier & Neustadt

[57] ABSTRACT

Operating a mode change switch changes the mode of a controller to first or third command control mode which is suitable for a work involving a large displacement of a manipulator or a second command control mode suitable for a work requiring precision. When an operation handle of an operation unit is operated, the controller controls the operation unit in each command control mode to drive the manipulator. In a case where a large-displacement-involving work and a precision-requiring work are continuously executed, therefore, the mode of the controller is first changed to the first or third command control mode by operating the mode change switch and then changed to the second command control mode. The manipulator can be driven in the proper command control mode for a work to be done.

9 Claims, 5 Drawing Sheets

| | FIRST COMMAND CONTROL MODE | SECOND COMMAND CONTROL MODE | THIRD COMMAND CONTROL MODE |
|---|---|---|---|
| (13) | 0 | 1 | 0 |
| (14) | 0 | 1 | 1 |
| (18) | 1 | 0 | 1 |
| (23) | 1 | 0 | 0 |
| (28) | 1 | 0 | 1 |
| (29) | 1 | 0 | 0 |
| (36) | 0 | 1 | 0 |
| (41) | 0 | 1 | 1 |
| (47) | 0 | 1 | 0 |
| (48) | 0 | 1 | 1 |

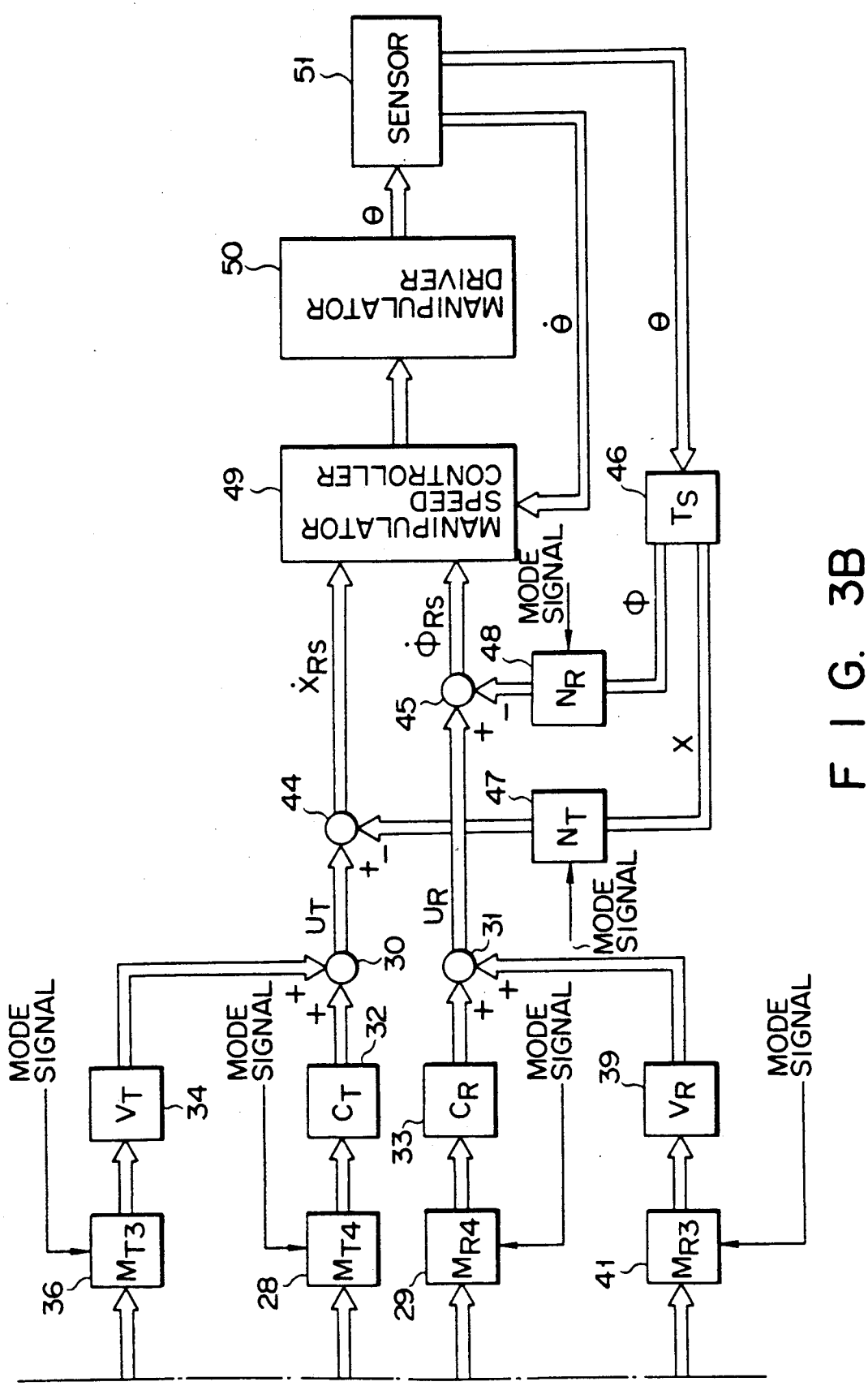
F I G. 3B

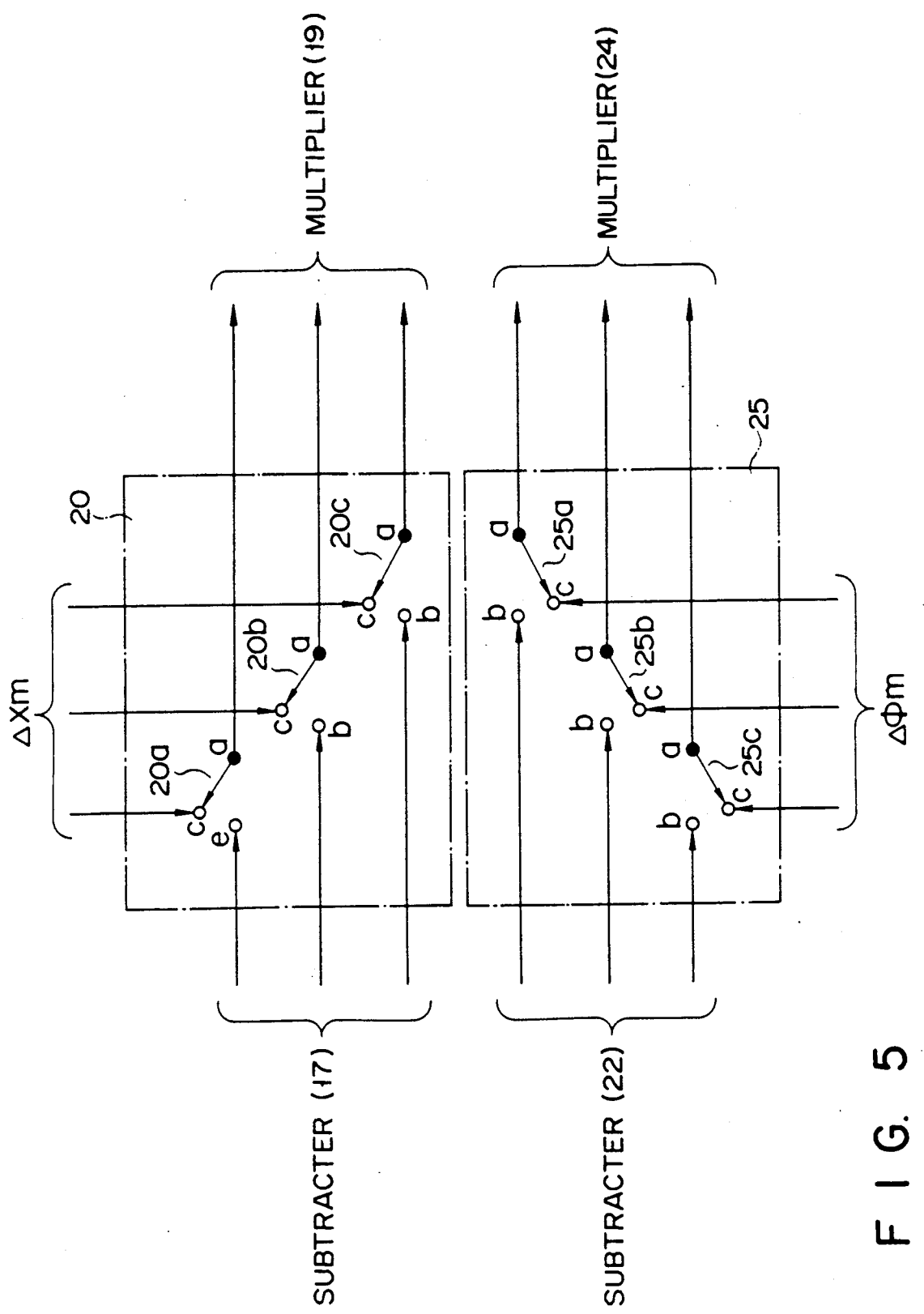
F I G. 5

MANIPULATOR OPERATING APPARATUS

BACKGROUND OF THE INVENTION

1. Field of the Invention

The present invention relates to a manipulator including a slave arm for use under an ultimate environment such as outer space, and, more particularly, to a manipulator operating apparatus that is used to operate a manipulator.

2. Description of the Related Art

Recently, in the field of space developments, there is an idea for building such a structure as a space station in outer space and conduct various experiments there. With regard to the construction work, it is effective to realize various safe and precise works by remotely operating a working manipulator using a manipulator system.

A manipulator operating apparatus for use in such a manipulator system is equipped with a rectangular coordinate type operation unit having an operation handle that has six degrees of freedom defined by three translation shafts substantially orthogonal to one another and three rotation shafts also substantially orthogonal to one another; a manipulator is controlled in a specific command control mode to realize the desired work by remotely operating this operation unit. There are two types of command control modes: a speed command control mode for driving the manipulator interlockingly with the operation of the operation unit a a speed associated with the displacement of the operation unit, and a position command control mode under bilateral master-slave control for controlling the manipulator interlockingly with the operation of the operation unit in association with the position and state of the operation unit. In the former mode, when the operation section of the operation unit takes a reference state at a reference position, a command is given to the manipulator to make its speed to zero and the manipulator is controlled by a speed command signal corresponding to the displacement of the operation unit which is associated with the operation thereof. When an operator stops operating the operation unit and takes his (or her) hand(s) off the operation handle of the operation unit, the handle resumes the reference state and returns to the reference position. In the second mode, the operation unit is controlled at a speed corresponding to the difference between the operation force applied to the operation handle and the force applied on the manipulator by the operation of the unit, and the manipulator is controlled by a position command signal corresponding to the position and state of the operation unit. In the position command control mode, which gives the operator the feeling as if he is directly operating the manipulator, when he stops operating the operation unit and takes his hand(s) off the operation handle, this handle is kept at the operated position if no force is applied to the manipulator.

Due to the structure, however, in the speed command control mode, the above manipulator operating apparatus is suitable to a work that requires a large amount of displacement of the free end of the manipulator but is not suitable to a work requiring precision such as an alignment work.

In the position command control mode, on the other hand, this manipulator operating apparatus is suitable to the latter precision-requiring work such as an alignment work, but is not suitable to the former work that requires a large displacement of the free end of the manipulator.

In short, the convention manipulator operating apparatus has a difficulty in realizing smooth and quick works in a case in which both of the above two types of works are continuously carried out.

The speed command control mode is disclosed in Japanese Patent Disclosure No. 62-173184, and the position command control mode in a technical report given on pages 75-81 of Japanese Robot Convention Report, Vol. 6, No. 1.

The above shortcomings are common not only to a space manipulator system but also to a ground manipulator system.

SUMMARY OF THE INVENTION

Accordingly, it is an object of this invention to provide a manipulator operating apparatus which can easily select the optimum command control system with a simple operation in accordance with the contents of a work to be done to thereby conduct various types of works smoothly and quickly.

To achieve the object, there is provided a manipulator operating apparatus comprising:
- a rectangular coordinate type operation unit, having an operation handle operably provided, for driving a working manipulator, the operation handle having six degrees of freedom defined by three translation shafts substantially orthogonal to one another and three rotation shafts orthogonal to one another;
- control means for controlling operation of the operation unit in a set command control mode to control driving of the manipulator interlockingly with operation of the operation handle of the operation unit, the set command control mode being settable to any of a plurality of different command control modes; and
- mode setting means for selecting the set command control mode of the control means.

BRIEF DESCRIPTION OF THE DRAWINGS

FIGS. 3A and 3B together form a block diagram illustrating the structure of a control section shown in FIG. 1;

FIG. 5 is a diagram for explaining the operation of the present apparatus.

DETAILED DESCRIPTION OF THE PREFERRED EMBODIMENT

A preferred embodiment of this invention will now be described referring to the accompanying drawings.

Figure 1:
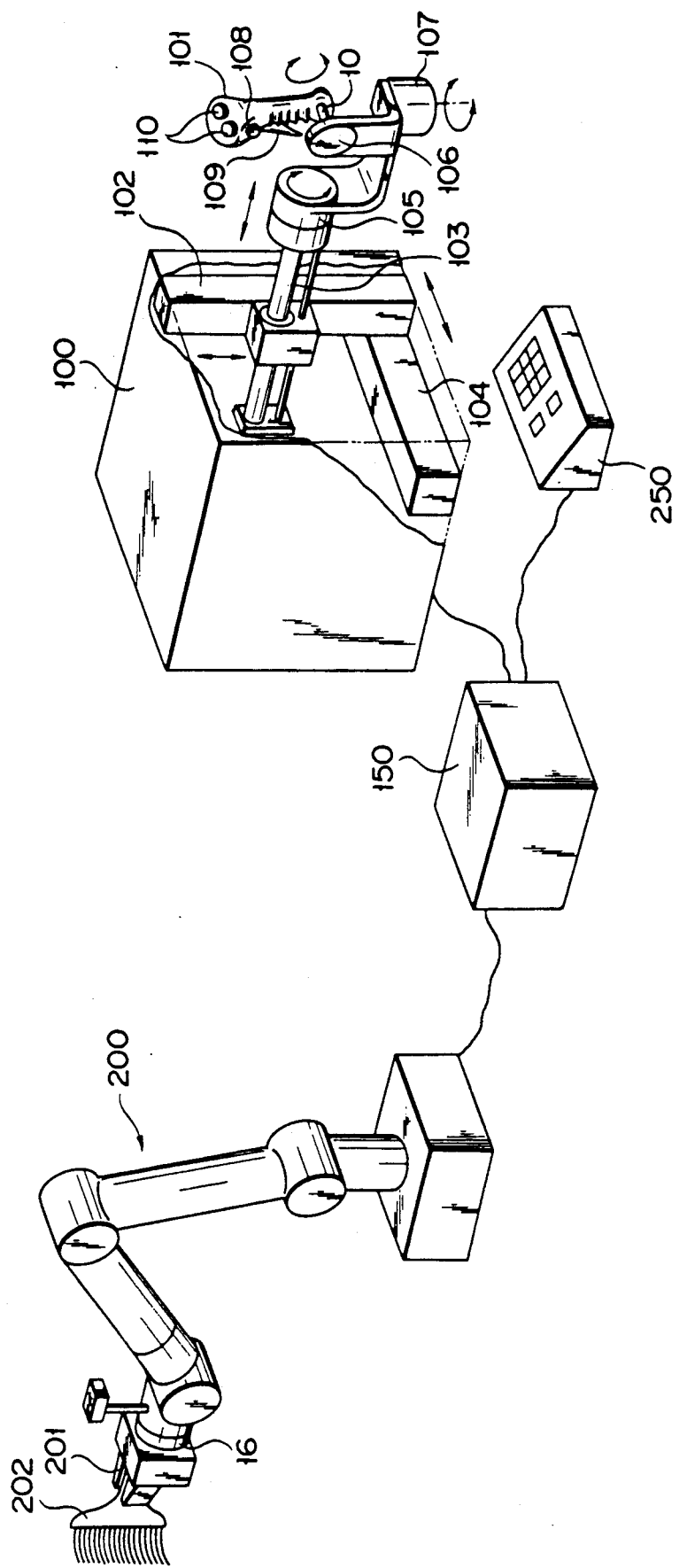
FIG. 1 is a perspective view of a manipulator operating apparatus according to one embodiment of this invention.
Figures 2, 4:
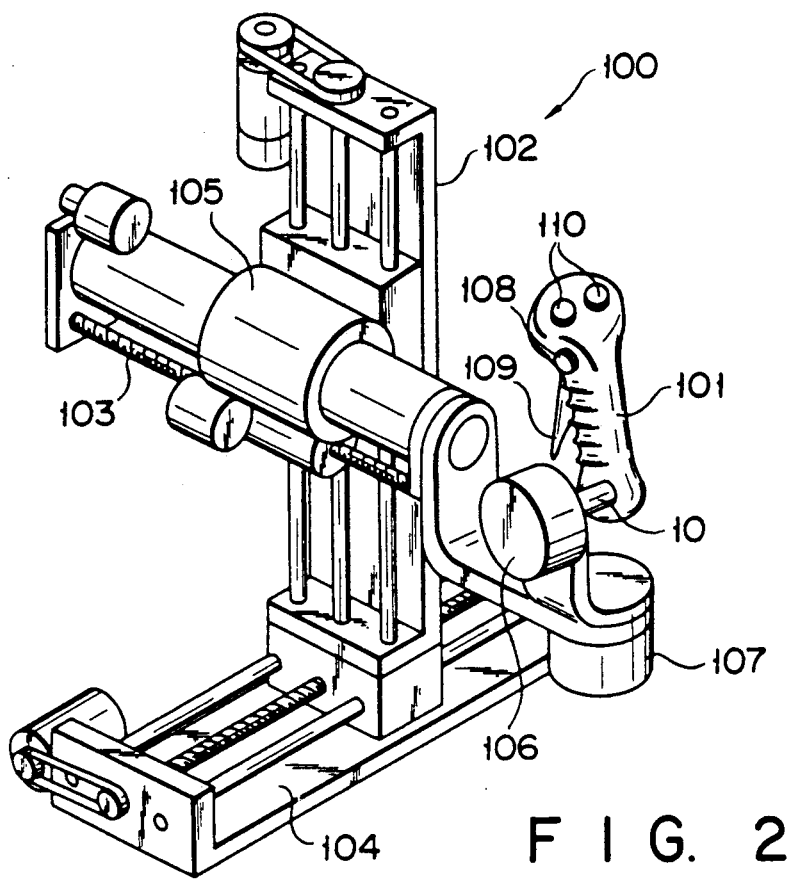
FIG. 2 is a perspective view illustrating an operation unit shown in FIG. 1.
FIG. 4 is a diagram illustrating a lock section shown in FIG. 3.

FIG. 1 illustrates a manipulator operating apparatus according to one embodiment of this invention; a reference numeral 100 denotes a rectangular coordinate type operation unit coupled through a controller 150 to a manipulator 200. As shown in FIG. 2, this unit 100 has an operation handle 101 provided in such a manner that the handle 101 can be freely subjected to translation along three translation shafts substantially orthogonal to one another through first to third translation mechanisms 102 to 104 and can be freely rotated around substantially-orthogonal rotation shafts through rotation mechanisms 105 to 107. The driving of the manipulator 200 is controlled, by the controller 150, interlockingly with the operation of the operation handle 101.

The operation handle 101 is provided with a mode change switch 108, an operation lever 109 for controlling the operation of a holding section 201 of the manipulator 200, and range change switches 110. When operated, the mode change switch 108 selectively sets the controller 150 in one of first to third control modes. The first mode, called a speed command control mode, is for controlling the manipulator 200 so that it is driven at a speed corresponding to the operation force applied to the operation handle 101. The second mode, called a position command control mode (bilateral master-slave control), is for controlling the manipulator 200 so that it is driven at a speed corresponding to the difference between target feedback force for an operator operating the operation handle 101 and force generated by the operation unit 100. The third control mode is for driving the three translation shafts in the second control mode and driving the three rotation shafts in the first control mode.

The operation lever 109, when operated, drives the hold section 201 of the manipulator 200 to hold or release a work tool 202. The range change switches 110, when operated, change the working range of the manipulator 200.

Figure 3A:
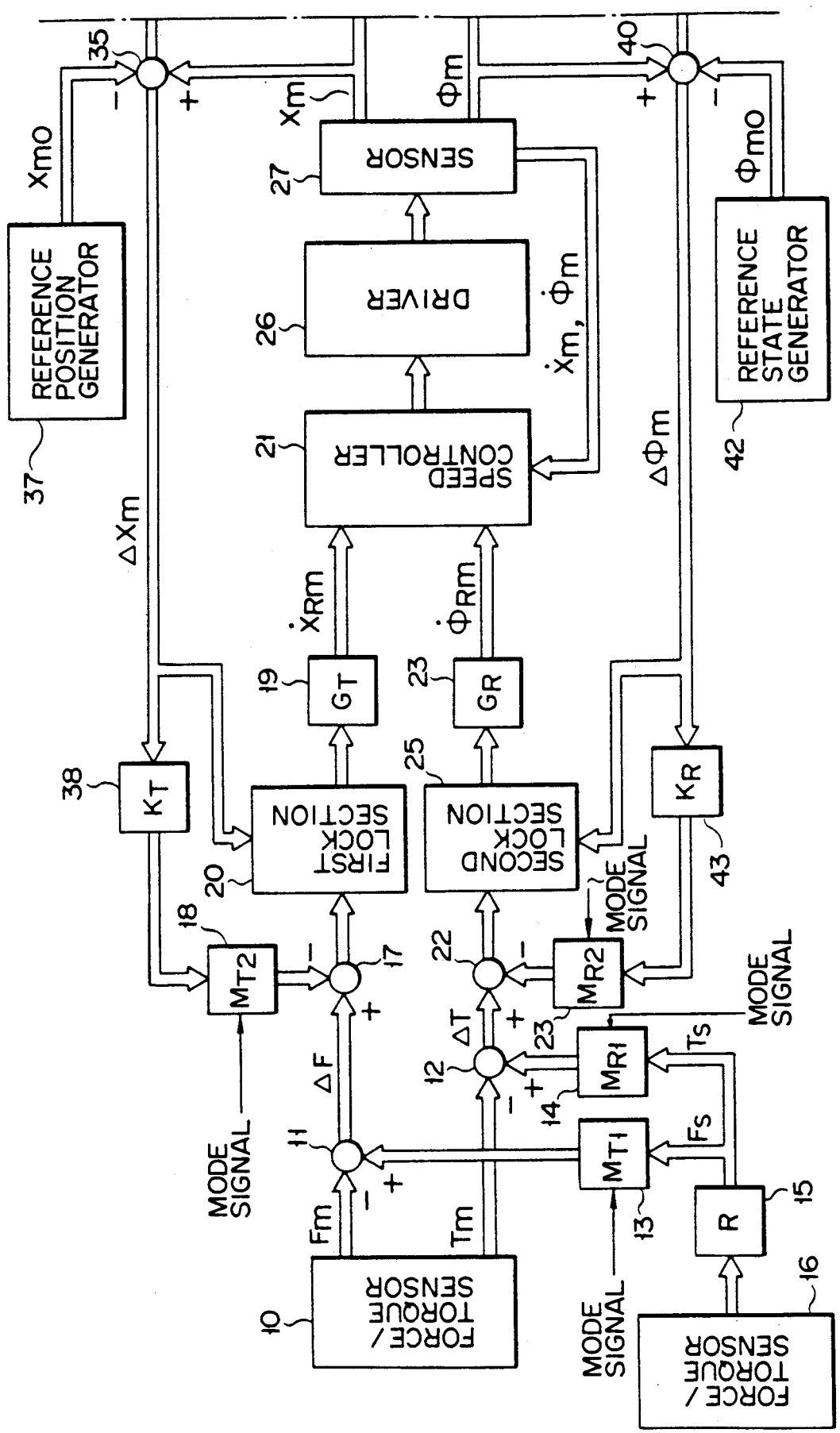

The operation unit 100 is also provided with a force/torque sensor 10 which detects force Fm applied to the three translation shafts and torque Tm applied to the three rotation shafts upon operation of the operation handle 101 and outputs Fm and Tm to the controller 150. The force Fm and torque Tm given to the controller 150 are respectively supplied to one input terminals of first and second subtracters 11 and 12, as shown in FIG. 3. The other input terminals of the subtracters 11 and 12 are coupled to output terminals of first and second mode change sections 13 and 14 which have their input terminals coupled to an output terminal of a multiplier 15. This multiplier 15, coupled to an output terminal of a force/torque sensor 16 provided at the controller 150, multiples the detected force and torque by a force reflection coefficient R to acquire a target feedback force Fs and target feedback torque Ts.

The first subtracter 11 performs subtraction of the received detection output Fm and target feedback force Fs to obtain $\Delta F$ and sends its output to a third subtracter 17. The third subtracter 17 has the other input terminal coupled to an output terminal of a third mode change section 18 and selectively receives, through this section 18, a value resulting from multiplication of a translation change $\Delta Xm$ by an imaginary spring constant $K_T$ associated with translation (which value will be described in a later section). The third subtracter 17 performs subtraction of values attained by multiplying the received $\Delta F$ and $\Delta Xm$ by the constant $K_T$ and sends the resultant value from its output terminal to a multiplier 19 through a first lock section 20 (to be described later). The multiplier 19 multiplies the received value by a driven characteristic coefficient $G_T$ associated with translation to acquire a translation speed target value $\dot{X}Rm$ and sends this value $\dot{X}Rm$ to an operation unit speed controller 21.

The second subtracter 12 performs subtraction of the received detection torque Tm and target feedback torque Ts to obtain $\Delta T$ and sends its output to a fourth subtracter 22. The fourth subtracter 22 has the other input terminal coupled to an output terminal of a fourth mode change section 23 and selectively receives, through this section 23, a value resulting from multiplication of a rotation change $\Delta \Phi m$ by an imaginary spring constant $K_R$ associated with rotation (which value will be described later). The fourth subtracter 22 performs subtraction of values attained by multiplying the received $\Delta T$ and $\Delta \Phi m$ by the constant $K_R$ and sends the resultant value from its output terminal to a multiplier 24 through a second lock section 25 (to be described later). The multiplier 24 multiplies the received value by a driven characteristic coefficient $G_R$ associated with rotation to acquire a rotation speed target value $\dot{\Phi}Rm$ and sends this value $\dot{\Phi}Rm$ to the operation unit speed controller 21.

The speed controller 21 generates a drive signal corresponding to the translation speed target value $\dot{X}Rm$ and rotation target value $\dot{\Phi}Rm$ and sends the signal to an operation unit driver 26. This driver 26 drives the first to third translation mechanisms 102-104 and first to third rotation mechanism 105-107 in response to the drive signal. The output of the driver 26 is supplied to a sensor 27 which detects a translation position and a rotation state. The position signal Xm and state signal $\Phi m$ are respectively supplied to fifth and sixth mode change sections 28 and 29. The mode change sections 28 and 29 are coupled to one input terminals of first and second adders 30 and 31 through multipliers 32 and 33. The first adder 30 has the other input terminal coupled to the output terminal of a multiplier 34 whose input terminal is coupled through a seventh mode change section 36 to an output terminal of a fifth subtracter 35. This fifth subtracter 35 receives the position signal Xm and a reference position signal Xmo from a reference position generator 37, computes the position change $\Delta Xm$ from the received values, and sends $\Delta Xm$ from its output terminal to the third mode change section 18 through the multiplier 38. The fifth subtracter 35 has its output terminal coupled to the first lock section 20.

The second adder 31 has the other input terminal coupled to the output terminal of a multiplier 39 whose input terminal is coupled through an eighth mode change section 41 to an output terminal of a sixth subtracter 40. This sixth subtracter 40 receives the state signal $\Phi m$ and a reference state signal $\Phi mo$ from a reference state generator 42, computes the state change $\Delta \Phi m$ by subtraction of the received values, and sends $\Delta \Phi m$ from its output terminal to the fourth mode change section 23 through the multiplier 43. The sixth subtracter 40 has its output terminal coupled to the second lock section 25.

The first and second adders 30 and 31 have their output terminals coupled to one input terminals of seventh and eighth subtracters 44 and 45. The subtracters 44 and 45 have other input terminals coupled to the output terminals of a position/state computing section 46 respectively through ninth and tenth mode change sections 47 and 48, and have their output terminals coupled to a manipulator speed controller 49. The speed controller 49 provides a drive signal corresponding to the received translation speed $\dot{X}RS$ and rotation speed $\dot{\Phi}RS$ and sends the signal to a manipulator driver 50. This manipulator driver 50 drives the manipulator 200 in response to the drive signal. The output of the manipulator driver 50 is supplied to a sensor 51, which detects a joint angle $\theta$ of the manipulator 200 from this input and sends data about the angle to the position/state computing section 43. Based on the joint angle θ, this computing section 43 computes a translation position signal X and a rotation state signal Φ and sends these signals to the ninth and tenth mode change sections 47 and 48.

When the mode change switch 108 is operated to select one of the first t third command control modes, the first to tenth mode change sections 13, 14, 18, 23, 28, 29, 36, 41, 47 and 48 have their respective mode signals changed to "0" or "1" depending on the selected command control mode, as shown in FIG. 4.

FIG. 5 illustrates in detail the first and second lock sections 20 and 25, which are respectively provided with first to third change switches 20a-20c and 25a-25c in association with the three translation shafts and three rotation shafts. These first to third change switches 20a-20c and 25a-25c are operably provided at an operation panel 250 as shown in FIG. 1. The operation panel 250 is disposed close to the operation unit 100 so as to ensure easy manipulation by the operator, for example. In accordance with the switching operation of the switches 20a-20c and 25a-25c, the first and second lock sections 20 and 25 restrict the movement of the three translation shafts and the rotation of the three rotation shafts of the operation unit 100 and lock the handle 101. The first to third change switches 20a-20c of the first lock section 20 have their movable contacts a coupled to the respective input terminals of the multiplier 19 which are associated with the three translation shafts, and have their fixed contacts b coupled to the respective output terminals of the third subtracter 17 which are associated with the translation shafts. The other fixed contacts c of the switches 20a-20c are supplied with output signals from the fifth subtracter 36 which are associated with the three translation shafts. The first to third change switches 25a-25c of the second lock section 25 have their movable contacts a coupled to the respective input terminals of the multiplier 24 which are associated with the three rotation shafts, and have their fixed contacts b coupled to the respective output terminals of the fourth subtracter 22 which are associated with the rotation shafts. The other fixed contacts c of the switches 25a-25c are supplied with output signals from the sixth subtracter 41 which are associated with the three rotation shafts.

Each of the first to third change switches 20a-20c and 25a-25c has its movable contact a coupled to the fixed contact b first, and when it is switched to the other fixed contact c, the rotation of the rotation shafts is locked.

A description will now be given of the operation of thus constituted manipulator operating apparatus. To perform a precision-requiring work using the manipulator 200, the mode change switch 108 of the operation handle 101 is operated to set the mode to the second command control mode. Then, the controller 150 sets the mode signals of the first, second and seventh to tenth mode change sections 13, 14, 36, 41, 47 and 48 to "1" and sets the mode signals of the third to sixth mode change sections 13, 23, 28 and 29 to "0." When the operation handle 101 is operated, the first and second subtracters 11 and 12 are respectively supplied with the force Fm of the three translation shafts and the torque Tm of the three rotation shafts (detected by the force/torque sensor 10 of the operation unit 100) and respectively with the target feedback force Fs and target feedback torque Ts which are attained by multiplying the force and torque of the translation shafts and rotation shafts (detected by the force/torque sensor 16 of the manipulator 200) by the force reflection coefficient R. The first subtracter 11 performs the subtraction of the received Fm and target feedback force Fs to acquire ΔF and the second subtracter 12 performs the subtraction of the received Tm and target feedback torque Ts to acquire ΔT. ΔF and ΔT are then supplied to multipliers 19 and 23 through the first and second lock sections 20 and 25. The multipliers 19 and 23 multiply the received ΔF and ΔT by the driven characteristic coefficients $G_T$ and $G_R$ to provide the aforementioned translation speed target value $\dot{X}Rm$ and the rotation speed target value $\dot{\Phi}Rm$, which are in turn supplied to the speed controller 21. The speed controller 21 provides a drive signal corresponding to the target values $\dot{X}Rm$ and $\dot{\Phi}Rm$ and sends the drive signal to the driver 26.

This driver 26 drives the first to third translation mechanisms 102-104 and first to third rotation mechanism 105-107 in response to the drive signal. The output of the driver 26 is supplied to the sensor 27 which detects the translation position and rotation state of the operation handle 101. The position signal Xm and state signal Φm are respectively supplied to the multipliers 32 and 33 through the fifth and sixth mode change sections 28 and 29. The multipliers 32 and 33 multiply the received position signal Xm and state signal Φm by proportional coefficients $C_T$ and $C_R$, respectively, and send the resultant signals to the seventh and eighth subtracters 44 and 45. The subtracters 44 and 45, which have the other input terminals supplied with the translation change ΔXm and rotation change ΔΦm, each subtract these two inputs from each other to attain the translation speed $\dot{X}RS$ and rotation speed $\dot{\Phi}RS$ and send these two outputs as commands UT and UR to the manipulator speed controller 49. The speed controller 49 attains a drive signal from the received $\dot{X}RS$ and $\dot{\Phi}RS$ and sends the signal to the manipulator driver 50. The driver 50 drives the manipulator 200 in accordance with the drive signal. This permits the operator to operate the manipulator 200 while feeling the force and torque corresponding to those actually applied to the manipulator 200, thus ensuring that precise and fine works can be done by the manipulator.

To perform a work involving a large displacement of the free end of the manipulator 200, the mode change switch 108 of the operation handle 101 is operated to set the mode to the first command control mode. Then, the controller 150 sets the mode signals of the third to sixth mode change sections 18, 23, 28 and 29 to "1" and sets the mode signals of the first, second and seventh to tenth mode change sections 13, 14, 36, 41, 47 and 48 to "0." When the operation handle 101 is operated, the force Fm and the torque Tm of the operation unit 100 detected by the force/torque sensor 10 are supplied through the first and second subtracters 11 and 12 to the third and fourth subtracters 17 and 22. The third subtracter 17 performs subtraction of the force Fm and a value attained by multiplying the translation change ΔXm supplied to the other input terminal thereof by the imaginary spring constant $K_T$ to acquire the translation speed target value $\dot{X}Rm$ and sends the resultant value to the speed controller 21. At the same time, the fourth subtracter 22 performs subtraction of the torque Tm and a value attained by multiplying the rotation change ΔΦm supplied to the other input terminal thereof by the imaginary spring constant $K_R$ to acquire the rotation speed target value $\dot{\Phi}Rm$ and sends the resultant value to speed controller 21. This speed controller 21 attains a drive signal corresponding to the target values XRm and ΦRm and sends the signal to the driver 26.

This driver 26 drives the first to third translation mechanisms 102-104 and first to third rotation mechanism 105-107 in response to the drive signal. The output of the driver 26 is supplied to the sensor 27 which detects the translation position and rotation state of the operation handle 101. The position signal Xm and state signal Φm are respectively supplied to fifth and sixth subtracters 35 and 40. The fifth subtracter 35 performs subtraction of the received position signal Xm and the reference position signal Xmo from the reference position generator 37 to acquire the translation change ΔXm. This change ΔXm is supplied through the multiplier 38 and third mode change section 18 to the third subtracter 17 and is supplied through the seventh mode change section 35 to the multiplier 34. This multiplier 34 multiplies the translation change ΔXm by the proportional coefficient VT to acquire the command UT. This command UT is supplied as the translation speed XRS to the manipulator speed controller 49 through the first adder 30 and seventh subtracter 44. At the same time, the sixth subtracter 40 performs subtraction of the received state signal Φm and the reference state signal Φmo from the reference state generator 42 to acquire the rotation change ΔΦm. This change ΔΦm is supplied through the multiplier 43 and fourth mode change section 23 to the fourth subtracter 22 and is also supplied through the eighth mode change section 41 to the multiplier 39. This multiplier 39 multiplies the rotation change ΔΦm by the proportional coefficient $V_R$ to acquire the rotation speed ΦRS serving as the command UR. This rotation speed is supplied to the manipulator speed controller 49 through the second adder 31 and eighth subtracter 45.

The speed controller 49 attains a drive signal corresponding to the translation speed XRS and rotation speed ΦRS and sends the signal to the manipulator driver 50. The driver 50 drives the manipulator 200 in accordance with the drive signal. This permits the operator to execute such a control as to produce a change corresponding to the operation force applied to the operation handle 101, i.e., to operate the manipulator 200 while feeling the imaginary reactive force and torque, thus ensuring that works involving a large displacement of the manipulator 200 can be executed.

In a case where a precision-requiring work should be done following a work involving a large displacement of the manipulator 200, the mode change switch 108 is operated first to set the mode to the third command control mode. Then, the controller 150 sets the mode signals of the second, third, fifth and eighth to tenth mode change sections 14, 18, 28, 41, and 48 to "1" and sets the mode signals of the first, fourth, sixth, seventh and ninth mode change sections 13, 23, 29, 36 and 47 to "0." When the operation handle 101 is operated, the third subtracter 17 is supplied with the force Fm of the operation unit 100 detected by the force/torque sensor 10, through the first subtracter 11. This third subtracter 17 performs subtraction of the received force Fm and a value attained by multiplying the translation change ΔXm, supplied to the other input terminal thereof, by the imaginary spring constant $K_T$ to acquire the translation speed target value XRm and sends this value to the speed controller 21.

At the same time, the second subtracter 12 is supplied with the torque Tm of the operation unit 100 detected by the force/torque sensor 10 and a value (as the target feedback torque Ts of the manipulator 200) attained by multiplying the torque detected by the force/torque sensor 16, by the reflection coefficient R. This second subtracter 12 performs subtraction of the received torque Tm and target feedback torque Ts to acquire ΔT and sends this value ΔT to the multiplier 24 through the second lock section 25. The multiplier 24 multiplies the received ΔT by the driver characteristic coefficient $G_R$ to acquire the rotation speed target value ΦRm and sends the resultant value to the speed controller 21.

The speed controller 21 attains a drive signal corresponding to the received target values XRm and ΦRm and sends this signal to the driver 26. This driver 26 drives the first to third translation mechanisms 102-104 and first to third rotation mechanism 105-107 in response to the drive signal. The output of the driver 26 is supplied to the sensor 27 which detects the position signal Xm and state signal Φm corresponding to the translation position and rotation state of the operation handle 101. The position signal Xm is supplied to the fifth subtracter 35. The fifth subtracter 35 performs subtraction of the received position signal Xm and the reference position signal Xmo from the reference position generator 37 to acquire the translation change ΔXm. This change ΔXm is supplied through the multiplier 38 and third mode change section 18 to the third subtracter 17 and is supplied through the seventh mode change section 35 to the multiplier 34. This multiplier 34 multiplies the translation change ΔXm by the proportional coefficient $V_T$ to acquire the command UT. This command UT is supplied as the translation speed XRS to the manipulator speed controller 49 through the first adder 30 and seventh subtracter 44.

The state signal Φm detected by the sensor 27 is supplied through the sixth mode change section 2 to the multiplier 33. The multiplier 33 multiplies the received state signal Φm by the proportional coefficient $C_R$ to acquire the command UR and sends this command UR to the eighth subtracter 45 through the second adder 31. The adder 45, which is supplied at the other input terminal with the rotation position signal Φ, performs subtraction of its two inputs to acquire the rotation speed ΦRS and sends this value to the speed controller 49. The speed controller 49 attains a drive signal corresponding to the translation speed XRS and rotation speed ΦRS and sends the signal to the manipulator driver 50. The driver 50 drives the manipulator 200 in accordance with the drive signal. As a result, the operation unit 100, when operated by the operator, is controlled for driving the multiplier 200 in the third command control mode in which the three translation shafts are controlled in the first command control mode and the three rotation shafts are controlled in the second command control mode. Accordingly, a work involving a large displacement of the manipulator can be done.

When the desired work involving a large displacement of the manipulator is completed, the mode change switch 108 is operated to change the mode to the second command control mode from the third command control mode. At this time, the three rotation shafts of the operation unit 100 resume the operated states to be in association with the state of the manipulator 200, so that a precise operation can be performed in the subsequent, second command control mode with substantially the same operational feeling as done in the third command control mode.

In a case where a work is done in any of the first to third command control mode with the desired one or ones of the translation shafts and rotation shafts being locked, the first to third change switches 20a-20c and 25a-25c of the first or second lock section 20 or 25 which is associated with the desired shaft(s) to be locked are selectively operated. The switches 20a-20c and 25a-25c, when operated, have their movable contacts a coupled to the fixed contacts c. At the same time, the mode change sections 28, 29, 36 and 41 associated with the operated switches 20a-20c and 25a-25c have their modes along and around the shafts being set to "0." This causes the operation handle 101 to be restricted and locked along or around the desired translation shaft(s) or rotation shaft(s). The manipulator 200 with the shaft(s) being locked is controlled.

According to the above embodiment, in a case where a work involving a large displacement of the manipulator 200 and a work requiring a precise operation thereof are continuously carried out, when the mode change switch 108 is operated to set the mode to the second command control mode suitable for a precision-requiring work after the large-displacement-involving work is done by the manipulator in the third command control mode, the translation shafts of the operation handle 101 are returned to the reference positions and the rotation shafts are kept at the operated positions. Consequently, the mode change is effected with the rotation state of the operation handle 101 after the changeover operation being associated with the state of the manipulator 200. Therefore, the operator can perform the manipulation in the next, second command control mode, with the rotation states of the shafts which are difficult to feel being kept at substantially the same state. It is therefore possible to smoothly and continuously execute different works.

Although, according to the above embodiment, the controller 150 having first to third command control modes is provided so as to ensure continuous execution of a large-displacement-involving work and a precision-requiring work, this invention is not restricted to the particular design. Substantially the same effect would be expected if the controller is designed to have at least the first and third command control modes or the first and second command control modes.

Although the foregoing description of the above embodiment has been given with reference to the mode change switch 108 being provided at the operation handle 101, this invention is not restricted to such a case; the switch 108 may be provided at other part than the handle 101.

Further, according to the embodiment, the first to third change switches 20a-20c and 25a-25c of the first and second lock sections 20 and 25 are provided at the operation panel 250, as separate from the operation unit 100 and controller 150. This invention is not, however, restricted to this design, and these switches may be provided integral with the unit 100 and controller 150.

It should be noted that this invention is in no way limited to the above-described embodiment, but may be modified in various manners within the scope of the invention.

What is claimed is:

1. A manipulator operation apparatus comprising:
   a rectangular coordinate type operation unit, having an operation handle, for driving a working manipulator interlockingly with actuation of said operation handle, said operation handle having three translation shafts substantially orthogonal to one another and three rotation shafts substantially orthogonal to one another and defining six degrees of freedom for said operation handle;
   handle driving means for driving said operation handle in relation to each of its three translation shafts and three rotation shafts;
   first detecting means, for detecting the force and torque applied to the three translation shafts of said operation handle, and the force and torque applied to the three rotation shafts of said operation handle;
   second detecting means, for detecting the force and torque applied to three translation shafts which are provided in one end portion of said manipulator and are substantially orthogonal to one another, and the force and torque applied to three rotation shafts which are provided in said one end portion of said manipulator and are substantially orthogonal to one another;
   control means for controlling said manipulator in either of a first command control mode or a second command control mode,
   wherein in said first command control mode, said handle driving means is controlled by said control means so as to displace said operation handle by an amount corresponding to the forces and torques detected by said first detecting means; and the three translation shafts and three rotation shafts of said manipulator are driven by a first command signal from said control means representing the amount of displacement of said operation handle;
   and wherein in said second command control mode, said handle driving means is controlled by said control means so as to displace said operation handle at a speed corresponding to the differences determined by a subtraction means, between the forces and torques detected by said first detecting means and values derived from a multiplying means by multiplying with one another predetermined coefficients and the forces and torques detected by said second detecting means; and the three translation shafts and three rotation shafts of said manipulator are driven by a second command signal from said control means representing the position and inclination of said operation handle; and
   mode setting means for switching said first and second command control modes from one to the other.

2. The manipulator operation apparatus according to claim 1, wherein said mode setting means is provided on said operation handle.

3. The manipulator operation apparatus according to claim 1, wherein said apparatus further comprises locking means for selectively locking at least one of the three translation shafts and three rotation shafts of said operation handle, by controlling said handle driving means.

4. A manipulator operation apparatus comprising:
   a rectangular coordinate type operation unit, having an operation handle, for driving a working manipulator interlockingly with actuation of said operation handle, said operation handle having three translation shafts substantially orthogonal to one another and three rotation shafts substantially orthogonal to one another and defining six degrees of freedom for said operation handle;
   handle driving means for driving said operation handle in relation to each of its three translation shafts and three rotation shafts;

first detecting means, for detecting the force and torque applied to the three translation shafts of said operation handle, and the force and torque applied to the three rotation shafts of said operation handle;

second detecting means, for detecting the force and torque applied to three translation shafts which are provided in one end portion of said manipulator and are substantially orthogonal to one another, and the force and torque applied to three rotation shafts which are provided in said one end portion of said manipulator and are substantially orthogonal to one another;

control means for controlling said manipulator in either of a first command control mode or a second command control mode, wherein in said first command control mode, said handle driving means is controlled by said control means so as to displace said operation handle at a speed corresponding to the differences, determined by a first subtraction means, between the forces and torques detected by said first detecting means and values derived from a first multiplying means by multiplying with one another predetermined coefficients and the forces and torques detected by said second detecting means; and the three translation shafts and three rotation shafts of said manipulator are driven by a first command signal from said control means representing the position and inclination of said operation handle;

and wherein in said second command control mode, said handle driving means is controlled by said control means so as to displace the three translation shafts of said operation handle by an amount corresponding to the force applied thereto and detected by said first detecting means; the three translation shafts of said manipulator are driven by a second command signal from said control means representing the amount of displacement of the three translation shafts of said operation handle; said handle driving means is controlled so as to displace the three rotation shafts of said operation handle at a speed corresponding to the difference determined by a second subtracting means between the torque applied to the three rotation shafts of said operation handle and detected by said first detecting means and a value derived from a second multiplying means by multiplying with each other one of said predetermined coefficients and the torque applied to the three rotation shafts of said manipulator and detected by said first detecting means; and the three rotation shafts of said manipulator are driven by a third command signal from said control means representing the positions and inclinations of the three rotation shafts of said operation handle; and mode setting means for switching said first and second command control modes from one to the other.

5. The manipulator operation apparatus according to claim 4, wherein said mode setting means is provided on said operation handle.

6. The manipulator operation apparatus according to claim 4, wherein said apparatus further comprises locking means for selectively locking at least one of the three translation shafts and three rotation shafts of said operation handle by controlling said handle driving means.

7. A manipulation operation apparatus comprising:

a rectangular coordinate type operation unit having an operation handle, for driving a working manipulator interlockingly with actuation of said operation handle, said operation handle having three translation shafts substantially orthogonal to one another and three rotation shafts substantially orthogonal to one another and defining six degrees of freedom for said operation handle;

handle driving means for driving said operation handle in relation to each of its three translation shafts and three rotation shafts;

first detecting means, for detecting the force and torque applied to the three translation shafts of said operation handle, and the force and torque applied to the three rotation shafts of said operation handle;

second detecting means, for detecting the force and torque applied to three translation shafts which are provided in one end portion of said manipulator and are substantially orthogonal to one another, and the force and torque applied to three rotation shafts which are provided in said one end portion of said manipulator and are substantially orthogonal to one another;

control means for controlling said manipulator in one of a first command control mode, a second command control mode, and a third command control mode, wherein in said first command control mode, said handle driving means is controlled by said control means so as to displace said operation handle by an amount corresponding to the forces and torques detected by said first detecting means; and the three translation shafts and three rotation shafts of said manipulator are driven by a first command signal from said control means representing the amount of displacement of said operation handle;

wherein in said second command control mode, said handle driving means is controlled by said control means so as to displace said operation handle at a speed corresponding to the differences determined by a first subtracting means between the forces and torques detected by said first detecting means and values derived from a first multiplying means by multiplying with one another predetermined coefficients and the forces and torques detected by said second detecting means; and the three translation shafts and three rotation shafts of said manipulator are driven by a second command signal from said control means representing the position and inclination of said operation handle;

and wherein said third command control mode, said handle driving means is controlled by said control means so as to displace the three translation shafts of said operation handle by an amount corresponding to the force applied to the three translation shafts of said operation handle and detected by said first detecting means; the three translation shafts of said manipulator are driven by a third command signal from said control means representing the amount of displacement of the three translation shafts of said operation handle; said handle driving means is controlled so as to displace the three rotation shafts of said operation handle at a speed corresponding to the difference determined by a second subtracting means between the torque applied to the three rotation shafts of said operation handle and detected by said first detecting means and a value obtained from a second multiplying means by multiplying with each other one of said predetermined coefficients and the torque applied to the three rotation shafts of said manipulator and detected by said second detecting means; and the three rotation shafts of said manipulator are driven by a fourth command signal from said control means representing the positions and inclinations of the three rotation shafts of said operation handle; and mode setting means for switching said first, second, and third command control modes from one to another.

8. The manipulator operation apparatus according to claim 7, wherein said mode setting means is provided on said operation handle.

9. The manipulator operation apparatus according to claim 7, wherein said apparatus further comprises locking means for selectively locking at least one of the three translation shafts and three rotation shafts of said operation handle, by controlling said handle driving means.

* * * * *

UNITED STATES PATENT AND TRADEMARK OFFICE
CERTIFICATE OF CORRECTION

PATENT NO.    :   5,021,969

DATED         :   June 4, 1991

INVENTOR(S) :   Ryo OKAMURA, et al.

It is certified that error appears in the above-identified patent and that said Letters Patent is hereby corrected as shown below:

On the title page, Item [30]

The second priority has been omitted.  Please add:

Feb. 14, 1989 [JP]    Japan    1-34409

Signed and Sealed this

Twentieth Day of April, 1993

*Attest:*

MICHAEL K. KIRK

*Attesting Officer*          *Acting Commissioner of Patents and Trademarks*